(12) United States Patent
Wang

(10) Patent No.: US 6,986,149 B2
(45) Date of Patent: Jan. 10, 2006

(54) DISK DRIVE HOUSING

(75) Inventor: Kuo-Jen Wang, Jungli (TW)

(73) Assignee: BenQ Corporation, Taoyuan (TW)

( * ) Notice: Subject to any disclaimer, the term of this patent is extended or adjusted under 35 U.S.C. 154(b) by 85 days.

(21) Appl. No.: 10/457,652

(22) Filed: Jun. 9, 2003

(65) Prior Publication Data

US 2003/0235129 A1    Dec. 25, 2003

(30) Foreign Application Priority Data

Jun. 20, 2002    (TW) .............................. 091113462 A

(51) Int. Cl.
*G11B 33/02*    (2006.01)

(52) U.S. Cl. .................................... 720/600

(58) Field of Classification Search ................ 720/600, 720/650; 361/685; 312/223.2; 360/137, 360/900, 903
See application file for complete search history.

(56) References Cited

U.S. PATENT DOCUMENTS

| | | | |
|---|---|---|---|
| 5,335,131 A | | 8/1994 | Sato et al. |
| 5,544,142 A | * | 8/1996 | Funakiri ...................... 720/650 |
| 5,886,869 A | * | 3/1999 | Fussell et al. .............. 361/685 |
| 6,296,334 B1 | * | 10/2001 | Liao ......................... 312/223.2 |
| 2002/0067592 A1 | * | 6/2002 | Horiuchi et al. ............ 361/685 |
| 2002/0118625 A1 | * | 8/2002 | Sugita et al. .............. 369/75.1 |

FOREIGN PATENT DOCUMENTS

JP    2003198154 A    *    7/2003

* cited by examiner

*Primary Examiner*—Tianjie Chen
(74) *Attorney, Agent, or Firm*—Snell & Wilmer L.L.P.

(57) ABSTRACT

The present invention provides a disk drive housing. The housing includes a panel, an upper housing, and a base plate. The upper housing extends to form a first extension and a second extension. The panel has a first slot and a second slot, which engage with the first extension and the second extension respectively. The panel further has a third slot and a fourth slot. The upper housing further includes a third extension engaged with the third slot. The base plate includes a fourth extension engaged with the fourth slot.

8 Claims, 6 Drawing Sheets

DISK DRIVE HOUSING

CROSS REFERENCE TO RELATED APPLICATIONS

This application claims priority of Taiwan Patent Application Serial No. 091113462 filed on Jun. 20, 2002.

FIELD OF INVENTION

The present invention relates to disk drive housing, especially one that includes a panel with slots.

BACKGROUND OF THE INVENTION

A conventional disk drive housing including a back housing 50 and a panel 60 is shown in FIG. 6. The panel 60 includes four latches 61, 62, 63, and 64. And the housing 50 includes four corresponding openings 51, 52, 53, and 54.

A conventional housing is easy to assemble, but its panel does not integrate well with the back housing. Therefore, a conventional housing may make noise and get the drive dust polluted. Besides, a disk drive housing that is not firm enough may be dangerous. For example, improper operation may crack the compact disk when the disc drive is reading data at high rotation speed. Then, the fragments of compact disk may burst out of the panel 60 and hurt the user, if the panel 60 does not integrate with the back housing 50 well.

Additionally, it is easy for users to dismantle the conventional housing by themselves, which at times results in disputes over warranty and repair services.

SUMMARY OF THE INVENTION

One aspect of the present invention provides a housing for disc drive that firmly packs the drive.

The present invention includes a panel, an upper housing, and a base plate. The upper housing extends to form a first extension and a second extension at two opposite side-edges of the upper housing. The panel has a first slot and a second slot respectively formed at two opposed side-edges of the panel; the two slots engage with the first extension and second extension respectively.

The panel further includes a third slot and a fourth slot. The upper housing further includes a third extension engaged with the third slot. The base plate further includes a fourth extension engaged with the fourth slot.

The advantages and spirit of the present invention may be further comprehended through the following detailed description and drawings.

DETAILED DESCRIPTION

The present invention discloses a disk housing 100 that firmly packs the drive.

Figure 1:
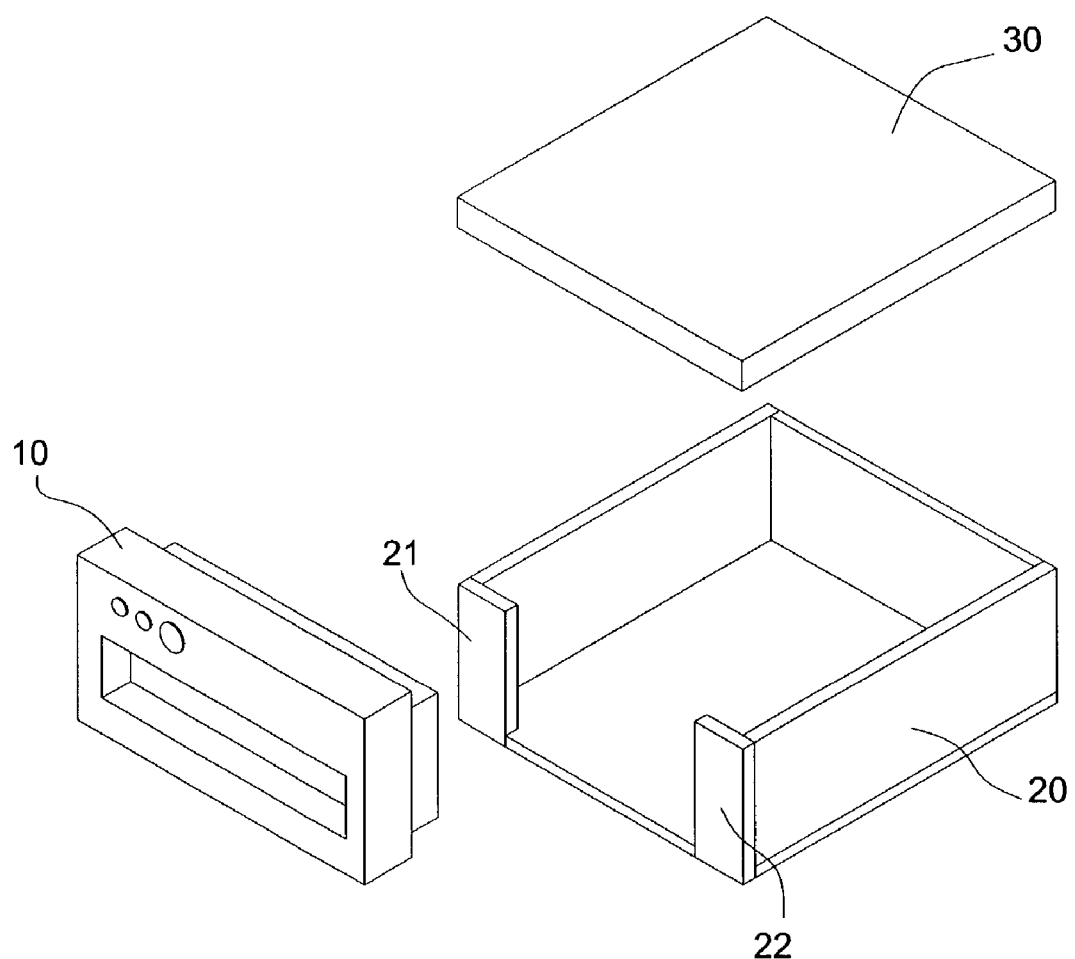
FIG. 1 is an explosive view of a first exemplary embodiment.

FIG. 1 is an explosive view of the first exemplary embodiment. The present invention includes a panel 10, an upper housing 20, and a base plate 30. The upper housing 20 extends to form a first extension 21 and a second extension 22. The first extension 21 and the second extension 22 are respectively formed at two opposite side-edges of the upper housing 20.

Figure 2A:
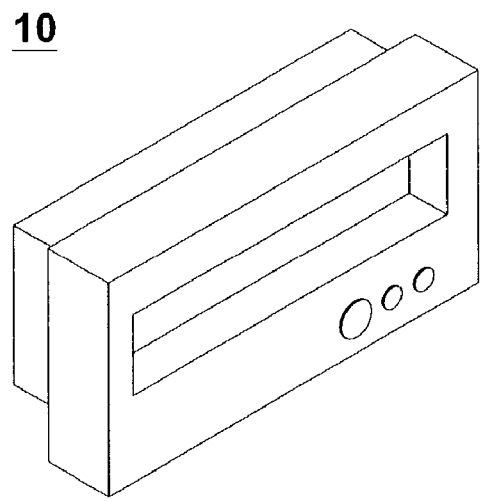
FIGS. 2a, 2b and 2c are respectively a perspective view, a top view and a side view of a panel.
Figure 2B:
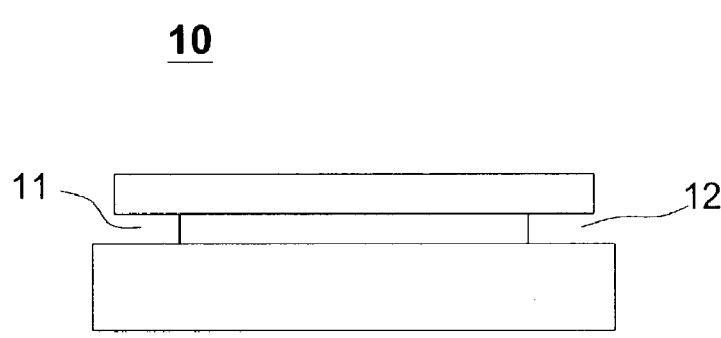
Figure 2C:
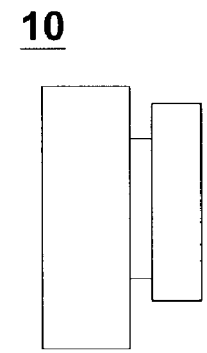
Figure 2D:
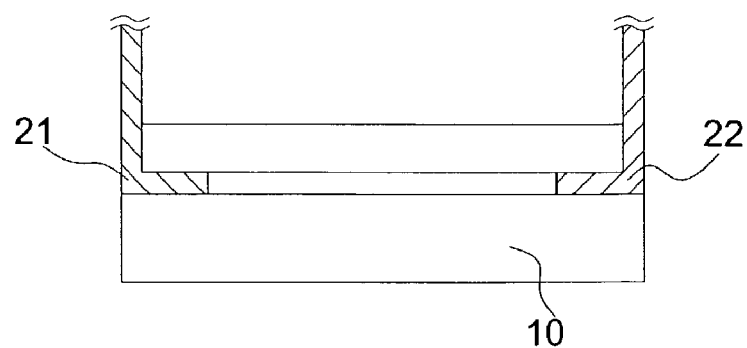
FIG. 2d is a schematic diagram showing a first extension and a second extension engaging with a first slot and a second slot.

FIGS. 2a, 2b and 2c are respectively a perspective view, a top elevation and a side view of the panel 10. The panel 10 has a first slot 11 and a second slot 12 respectively formed at two opposite side-edges of the panel 10; the two slots engage with the first extension 21 and the second extension 22 respectively. FIG. 2d is a schematic diagram showing the first extension 21 and the second extension 22 engaging with the first slot 11 and the second slot 12.

Improper operation may crack the compact disk (not shown) when the drive (not shown) is reading/writing data at high rotation speed. Then, the fragments of the compact disk may ram the panel 10 and make lateral movement between the panel 10 and the upper housing 20. Therefore, the fragments of compact disk may burst out and hurt the user. The way the first extension 21 and the second extension 22 engaging with the panel 10 of the present invention may pack the drive more firmly and prevent lateral movement between the panel 10 and the upper housing 20. Also, it is easy to disassemble.

Figure 3:
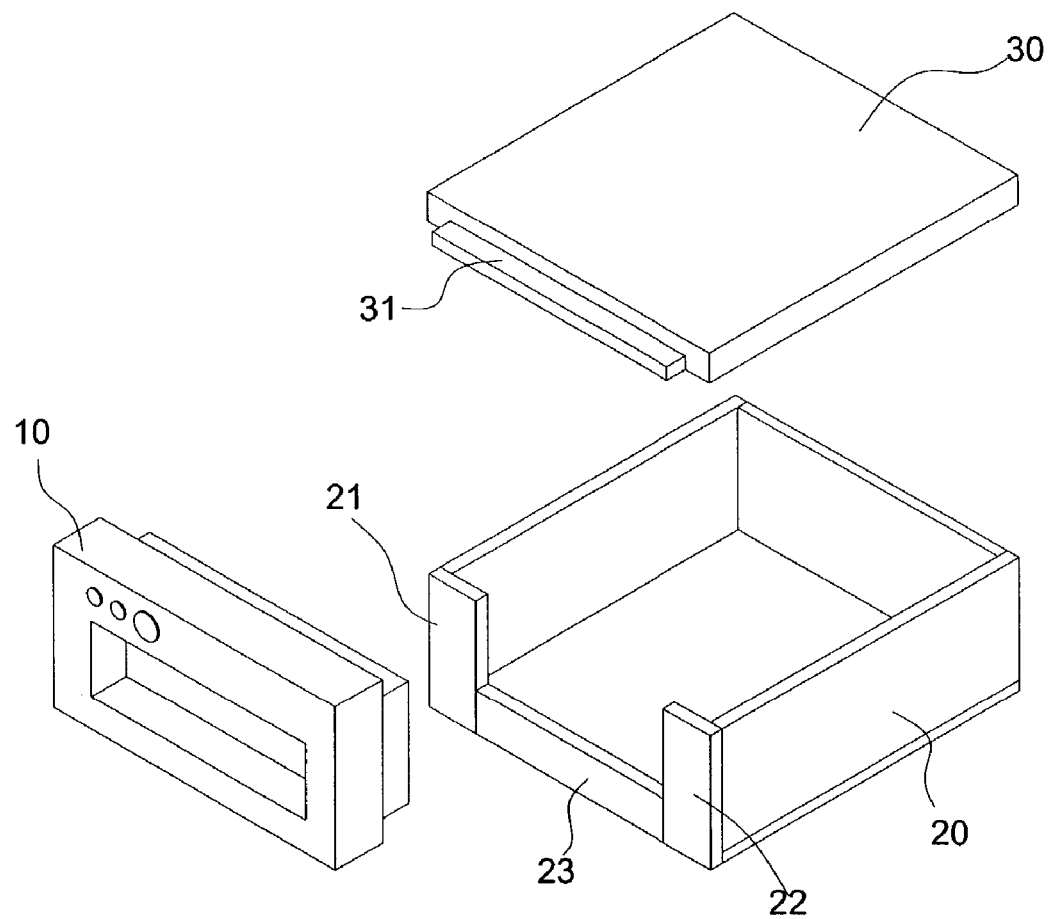
FIG. 3 is an explosive view of a second exemplary embodiment.

FIG. 3 is an explosive view of the second exemplary embodiment. The present invention includes a panel 10, an upper housing 20, and a base plate 30. The upper housing 20 extends to form a first extension 21, a second extension 22, and a third extension 23. The first extension 21 and the second extension 22 are respectively formed at two opposite side-edges of the upper housing 20. The base plate 30 extends to form a fourth extension 31.

Figure 4A:
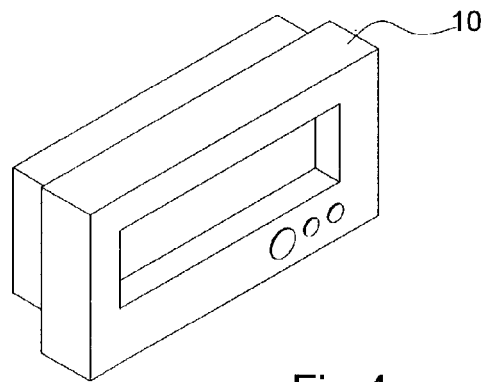
FIGS. 4a, 4b and 4c are respectively a perspective view, a top view and a side view of a panel.
Figure 4B:
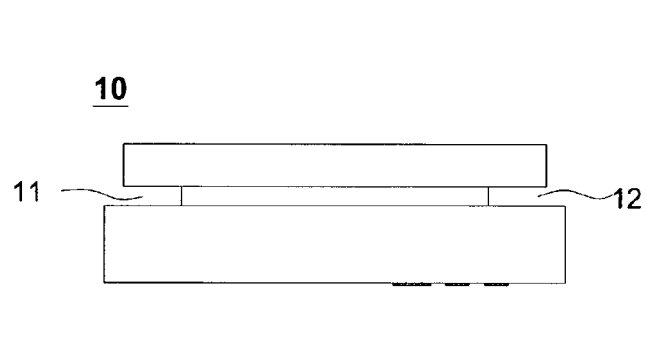
Figure 4C:
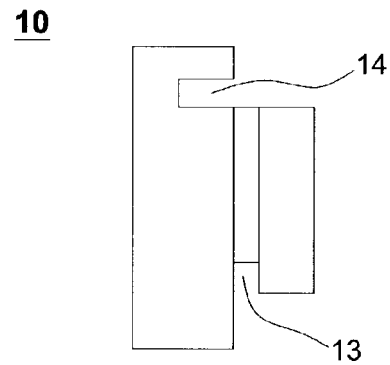
Figure 4D:
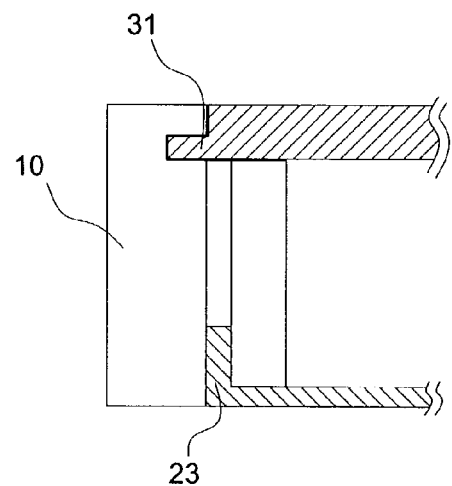
FIG. 4d is a schematic diagram showing a third extension and a fourth extension engaging with a third slot and a fourth slot.

FIGS. 4a, 4b, and 4c are respectively a perspective view, a top and a side view of the panel 10. The panel 10 has a first slot 11, a second slot 12, a third slot 13, and a fourth slot 14. The first slot 11 and the second slot 12 are respectively formed at two opposite side-edges of the panel 10; the two slots engage with the first extension 21 and second extension 22 respectively. The third slot 13 is for engaging with the third extension 23. The fourth slot 14 is for engaging with the fourth extension 31. FIG. 4d is a schematic diagram showing the third extension 23 and the fourth extension 31 engaging with the third slot 13 and the fourth slot 14.

The difference between the first and the second exemplary embodiments lies in the additional third slot 13 and the corresponding third extension 23 of the panel 10, which enhances the integration of the upper housing 20 and the panel 10. Besides, the engagement of the fourth extension 31 and the fourth slot 14 further integrates the base plate 30 with the panel 10, and prevents longitudinal movement of the panel 10.

Figure 5:
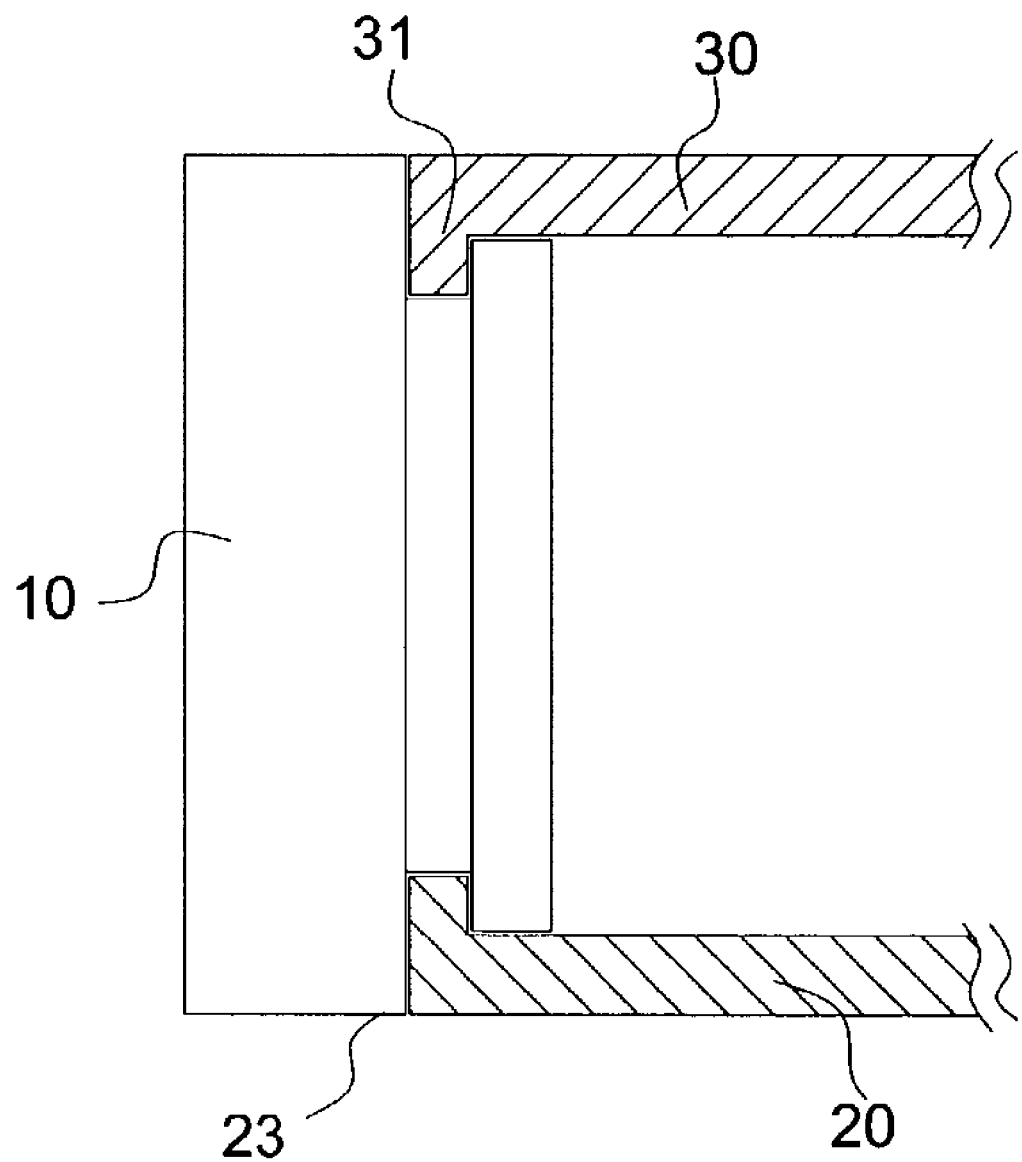
FIG. 5 is another schematic diagram showing a third extension and a fourth extension engaging with a third slot and a fourth slot.
Figure 6:
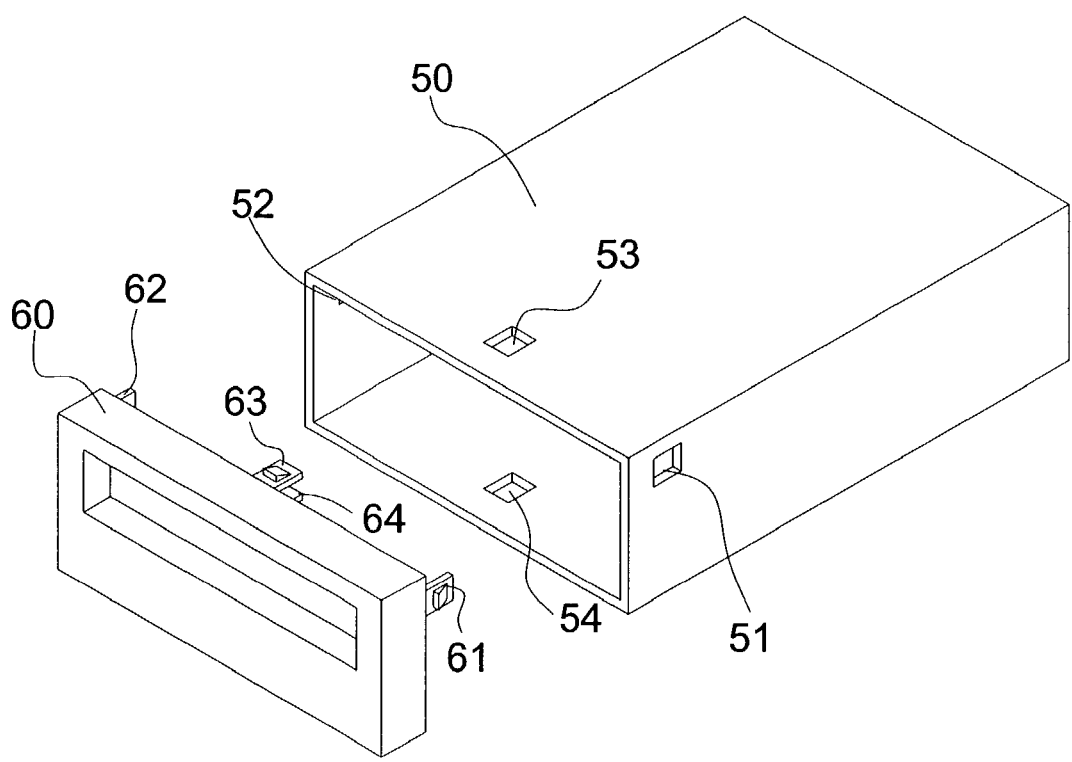
FIG. 6 shows a conventional disk drive housing.

While this invention has been described with reference to the illustrative embodiments, these descriptions should not be construed in a limiting sense. Various modifications of the illustrative embodiment, as well as other embodiments of the invention, will be apparent upon reference to these descriptions. For example, the fourth extension 31 of the base plate 30 may engage with the fourth slot 14 of the panel 10 through the manner shown in FIG. 5. It is therefore contemplated that the appended claims will cover any such modifications or embodiments as falling within the true scope of the invention and its legal equivalents.

I claim:

1. A disk drive housing, comprising:
   a panel, the panel including a first slot and a second slot respectively formed at two opposed sidewalls of the panel, each of the sidewalls having a long side and a short side, the first slot and the second slot respectively extending along the long side of the sidewalls of the panel; and
   an upper housing, having a main plate and two side plates formed at two opposed side-edges of the main plate, the two opposed side plates of the upper housing respectively extending to form a first extension and a second extension respectively perpendicular to the two opposed side plates, and an opening being defined between the first extension and the second extension;
   wherein the first extension and the second extension respectively slide into and engage with the first slot and second slot, the opening being covered by the panel, and the main plate being substantially perpendicular to the panel.

2. The housing of claim 1, further comprising a base plate attaching with the panel and the upper housing.

3. The housing of claim 2, wherein the panel further comprises a third slot, and the upper housing further includes a third extension for engaging with the panel at the third slot.

4. The housing of claim 3, wherein the panel further comprises a fourth slot, the base plate further includes a fourth extension for engaging with the panel at the fourth slot and for preventing longitudinal movement between the panel and the base plate, the longitudinal movement is perpendicular to the lateral movement.

5. A disk drive housing, comprising:
   a panel, the panel comprising a first slot, a second slot and a third slot, the first slot and the second slot being respectively formed at two opposed sidewalls of the panel, each of the sidewalls having a long side and a short side, the first slot and the second slot respectively extending along the long side of the sidewalls of the panel; and
   an upper housing, having a main plate and two side plates formed at two opposed side-edges of the main plate, the two side plates and the main plate of the upper housing respectively extending to form a first extension, a second extension and a third extension, the first extension and the second extension being respectively perpendicular to the two opposed side plates and an opening being defined between the first extension and the second extension;
   wherein the first extension, the second extension, and the third extension respectively slide into and engage with the first slot, the second slot and the third slot, the opening being covered by the panel, and the main plate being substantially perpendicular to the panel.

6. The housing of claim 5, further comprising a base plate attaching with the panel and the upper housing.

7. The housing of claim 6, wherein the panel further comprises a fourth slot, the base plate further includes a fourth extension for engaging with the panel at the fourth slot and for preventing longitudinal movement between the panel and the base plate, the longitudinal movement is perpendicular to the lateral movement.

8. A disk drive housing, comprising:
   a panel, the panel including a first slot, a second slot, a third slot and a fourth slot, the first slot and the second slot being respectively formed at two opposed sidewalls of the panel, each of the sidewalls having a long side and a short side, the first slot and the second slot respectively extending along the long side of the sidewalls of the panel;
   an upper housing, having a main plate and two side plates formed at two opposed side-edges of the main plate, the two side plates and the main plate of the upper housing extending to form a first extension, a second extension and a third extension for respectively sliding into and engaging with the first slot, the second slot and the third slot, and an opening, defined between the first extension and the second extension, being covered by the panel, and the first extension and the second extension being respectively perpendicular to the two opposed side plates, and the main plate being substantially perpendicular to the panel; and
   a base plate being substantially perpendicular to the panel, the base plate extending to form a fourth extension for sliding into and engaging with the fourth slot and for preventing longitudinal movement between the panel and the base plate, the longitudinal movement being perpendicular to the lateral movement.

* * * * *